United States Patent [19]

Nakamura et al.

[11] Patent Number: 4,706,555
[45] Date of Patent: Nov. 17, 1987

[54] ELECTRIC COFFEE MAKER

[75] Inventors: Toshio Nakamura, Osaka; Tadashi Tamura, Hyogo; Naomi Kimura, Ibaraki; Susumu Urata, Takatsuki, all of Japan

[73] Assignee: Matsushita Electric Industrial Co., Ltd., Osaka, Japan

[21] Appl. No.: 881,035
[22] PCT Filed: Oct. 22, 1985
[86] PCT No.: PCT/JP85/00590
  § 371 Date: Jun. 23, 1986
  § 102(e) Date: Jun. 23, 1986
[87] PCT Pub. No.: WO86/02816
  PCT Pub. Date: May 22, 1986

[30] Foreign Application Priority Data

Nov. 5, 1984 [JP] Japan .................. 59-232633
Nov. 5, 1984 [JP] Japan .................. 59-232634
Nov. 5, 1984 [JP] Japan .................. 59-232635
Nov. 5, 1984 [JP] Japan .................. 59-232636

[51] Int. Cl.⁴ ............................................ A47J 31/42
[52] U.S. Cl. .................................... 99/283; 99/286
[58] Field of Search ............... 99/279, 286, 280, 283, 99/299, 300, 302 R, 304, 305, 307, 281; 141/282.1, 101.2; 426/433

[56] References Cited

U.S. PATENT DOCUMENTS 3,967,546 7/1976 Cailliot .......................... 99/286
4,172,413 10/1979 Roseberry ..................... 99/286
4,555,984 12/1985 Yamashita ..................... 99/286

FOREIGN PATENT DOCUMENTS 2330078 1/1974 Fed. Rep. of Germany .
58-51871 11/1983 Japan .

Primary Examiner—Robert W. Jenkins
Attorney, Agent, or Firm—Stevens, Davis, Miller & Mosher

[57] ABSTRACT

An electric coffee maker comprises a material grinding compartment (24) having a cutter (23) adapted to be drivingly rotated by a driving motor (22) provided in a coffee maker body (37); a filtering compartment (25) provided side by side with and communicated with the material grinding compartment (24); a tank (42) for containing water; a heater section (39) for heating water supplied from the tank (42); and a change-over device (64) for performing a change-over action such that water having been heated by the heater section (39) is circulated through the tank (42) or supplied to the filtering compartment (25). When the temperature of hot water contained in the tank (42) reaches a boiling temperature owing to a circulating action in which water contained in the tank (42) returns to the tank (42) through the heater section (39) and the change-over device (64) from the tank (42), a thermal responsive member (57) adapted to act in response to the temperature of hot water affords a change-over action between a position in which hot water circulates through the tank (42) and a position in which hot water is supplied to the filtering compartment (25).

8 Claims, 9 Drawing Figures

F I G. 6
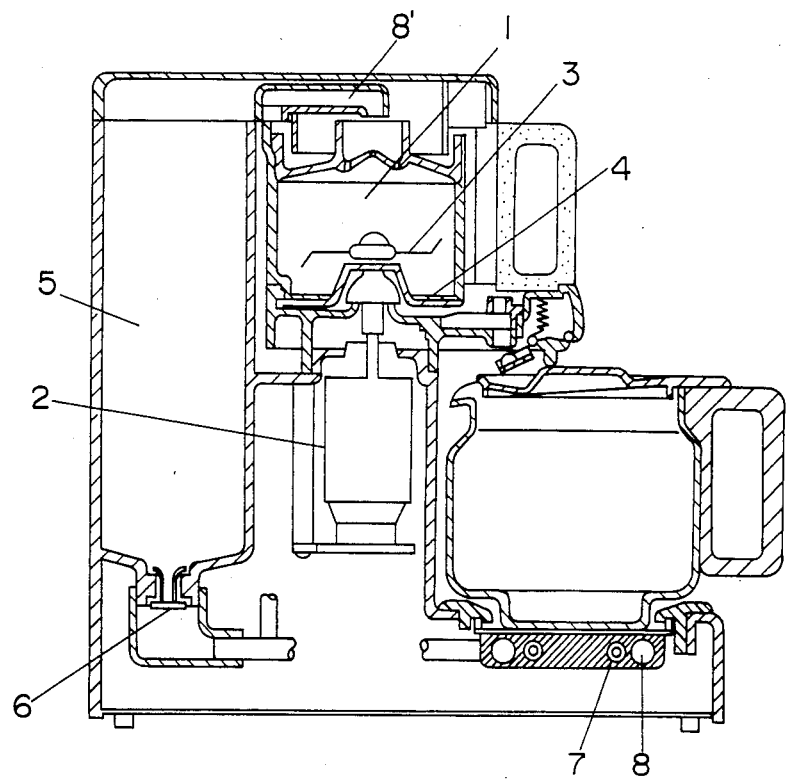
F I G. 7
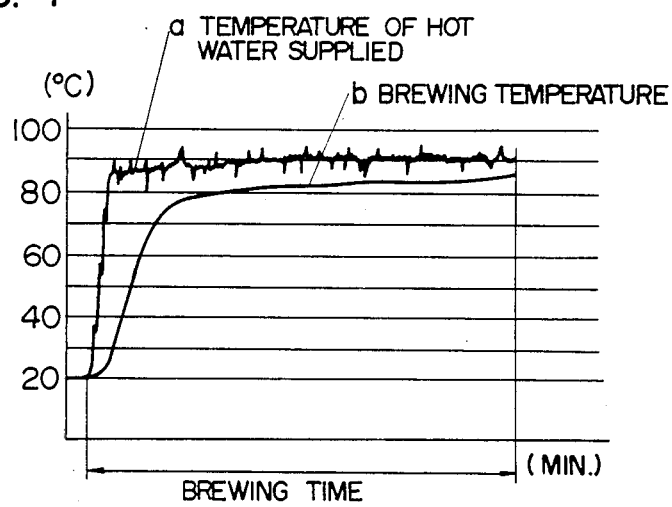

ELECTRIC COFFEE MAKER

TECHNICAL FIELD

The present invention relates to an electric coffee maker which functions to grind coffee beans and can automatically brew coffee by allowing boiled water to drip over the ground coffee.

BACKGROUND ART

Full automatic coffee makers constructed as shown in FIGS. 6 and 8 have heretofore been known which combine the functions of grinding coffee beans and causing boiling water to drip over the ground coffee, the dripping function automatically starting immediately after the coffee beans have been ground. The coffee maker constructed as shown in FIG. 6 has a vessel 1 in which a coffee grinding compartment and a filtering compartment for brewing coffee and separating the brewed coffee and coffee grounds from each other are integrally formed. Within the interior of the vessel 1 there is provided a cutter 3 rotatably driven by a driving motor 2. A filter 4 for separating brewed coffee and coffee grounds is provided at the bottom of the vessel 1. Coffee is brewed in this coffee maker in the following manner: after coffee beans have been ground by the cutter 3, water contained in a water reservoir 5 is introduced through a check valve 6 into a water pipe 8 formed integral with a heater 7, and is heated thereat. Hot water is then pumped up by virtue of steam pressure generated from the heated water to a discharge pipe 8' positioned above the vessel 1, and is poured therefrom into the vessel 1.

In a coffee maker constructed in this manner, the cutter 3 is rotated at high speed to generate a large centrifugal force at the time of grinding coffee beans. Since a filter member, if disposed on the peripheral wall of the vessel 1, is immediately damaged by this operation, such filter member or filter 4 must be disposed at the bottom of the vessel where it can be kept relatively free from the effect of the centrifugal force. In terms of the material of the filter 4, a mesh type filter 4 made of stainless wire is employed in place of filter paper which is commonly used in brewing coffee, since such filter paper would easily be damaged at the time of grinding.

Generally, in order to brew a delicious coffee, it is essential to grind coffee beans to a suitable particle size and to reduce an amount of fine powder (having a particle size of smaller than 48 mesh) in the ground coffee. Also, it is essential to brew the thus ground coffee with hot water, which has once been boiled, at a temperature ranging between 92° C. and 96° C. for about 3 to 4 minutes. In order to complete brewing in three to four minutes, it is a deciding factor to provide an adequate capacity for a filter member, to form an appropriate filtering layer in the ground coffee by pouring hot water on the ground coffee to swell the same well, and to gently and continuously pour hot water on the ground coffee without stirring the filtering layer. Grinding carried out in the construction described above presents a state of high speed grinding in a closed space represented in engineering of pulverization to produce a large amount of fine powder. In the construction described above, the filter 4 has a small area of filtering and ground coffee clogs the mesh of the filter 4 at the time of grinding while a large amount of fine powder fills up the gaps among particles of coffee, so that time required for filtering becomes quite long with the result that it usually takes seven to twelve minutes to brew five cups of coffee.

In the above-described hot-water supplying system, it is not possible to raise the temperature of water to an adequate degree. This system exhibits the characteristics shown in FIG. 7 and relating to temperature of hot water supplied and brewed coffee relative to. In FIG. 7, the curvatures shown by a and b denote temperatures of supplied hot water and brewed coffee while c designates brewing time.

For this reason, the coffee brewed by the coffee maker shown in FIG. 6 proves unpalatable. Furthermore, it becomes muddy because of the finely ground coffee beans contained therein.

A coffee maker shown in FIG. 8 includes a coffee bean grinding compartment 9 and a filtering compartment 10 for brewing coffee and separating this brewed coffee from coffee grounds by means of a filtering material such as a paper filter, the grinding and filtering compartments being constructed separately. The grinding compartment 9 receives a cutter 12 rotated by a driving motor 11. A perforated portion 13 for discharging ground coffee is provided on a part of the peripheral wall of the grinding compartment 9. The perforated portion 13 and the filter compartment 10 communicate with each other through a transfer pipe 14, so that, when coffee beans are ground within the grinding compartment 9 to a suitable particle size, the ground coffee is sequentially discharged through the perforated portion 13 onto a filter 15 disposed in the filtering compartment 10. Upon completion of this discharge, coffee is brewed by the same principle as that of the coffee maker shown in FIG. 6.

Although the coffee maker shown in FIG. 8 is improved in terms of the generation of fine powder at the time of grinding and the filtering capacity of a filter material as compared with the coffee maker shown in FIG. 6, no improvement has been made with respect to the temperature of hot water supplied during the brewing and the brewing time. It also suffers a serious problem in terms of operability. Generally, coffee beans contain a large amount of fats, and they therefore become sticky when ground. In consequence, all the coffee ground in the grinding compartment 9 is not discharged to the filtering compartment 10, a part of it adhering to the inner wall of the transfer pipe 14. When brewing coffee, steam generated during the brewing enters the transfer pipe 14 and is condensed therein, thus preventing the adhered coffee from leaving the transfer pipe 14. As grinding of coffee beans and brewing of coffee are repeated, the transfer pipe 14 may become clogged, eventually leading to the suspension of its discharging function. To solve this problem, the coffee grinding compartment 9 must be removed and washed everytime it is used. However, such washing is often not conducted, and the large number of parts to be cleaned makes this cleaning troublesome. The coffee which has been ground is discharged at a high speed, so that when it is once discharged on the filter material 15 disposed in the filtering compartment 10, it may bounce and scatter, thereby causing a part of the ground coffee to enter the gap between the filter material 15 and the filtering compartment 10 and to become mixed with the brewed coffee.

DISCLOSURE OF INVENTION

An electric coffee maker according to the present invention comprises a material grinding compartment having a cutter adapted to be drivingly rotated by a driving motor provided in a coffee maker body; a filtering compartment provided side by side with and communicated with said material grinding compartment; a tank for containing water; a heater section for heating water supplied from said tank; and a change-over means for performing a change-over action such that water having been heated by said heater section is circulated through said tank or supplied to said filtering compartment, said change-over means being constructed such that when the temperature of hot water contained in said tank reaches a boiling temperature owing to a circulating action in which water contained in said tank returns to said tank through said heater section and said changeover means from said tank, a thermal responsive member adapted to act in response to the temperature of hot water affords a change-over action between a position in which hot water circulates through said tank and a position in which hot water is supplied to said filtering compartment. With such arrangement, the temperature of hot water as supplied readily reaches a boiling temperature at the time of change-over from a position in which hot water is circulated through the tank to a position in which hot water is supplied to the filtering compartment since hot water contained in the tank is raised in temperature, and supplying of hot water to the filtering compartment is completed in a short period of time. As a consequence, coffee as brewed has a good aroma and a natural flavor of high quality.

BRIEF DESCRIPTION OF THE DRAWINGS

FIG. 6 is a side sectional view of a known fully-automatic electric coffee maker in which a coffee bean grinding compartment and a filtering compartment are united;

FIG. 7 shows the characteristic between the brewing temperature and the brewing time in the coffee maker of FIG. 6.

BEST MODE FOR CARRYING OUT THE INVENTION

Figure 1:
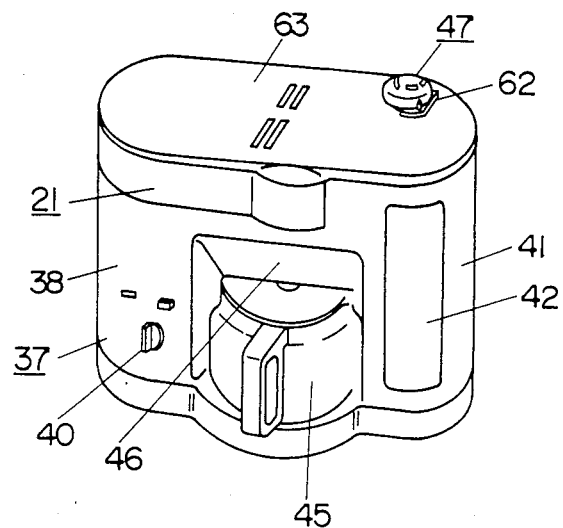
FIG. 1 is a perspective view of an electric coffee maker according to an embodiment of the present invention.
Figure 2:
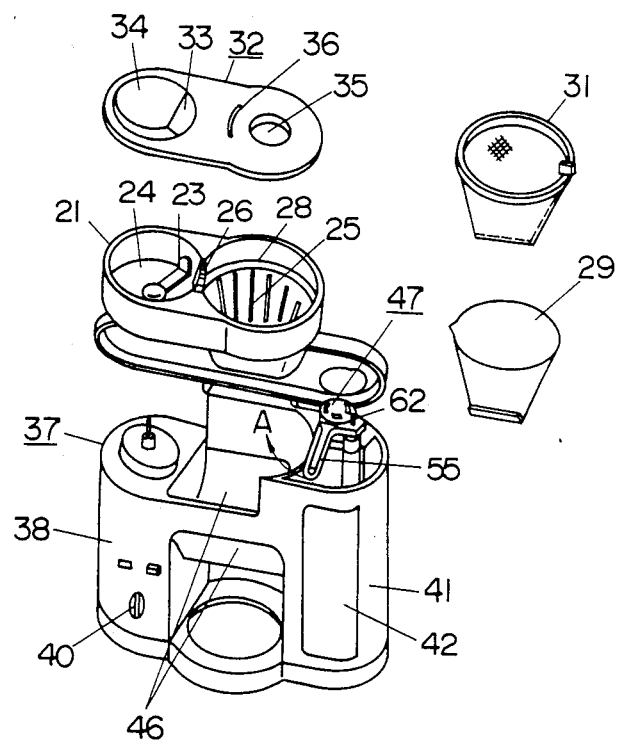
FIG. 2 is an exploded, perspective view of the electric coffee maker of FIG. 1.
Figure 3:
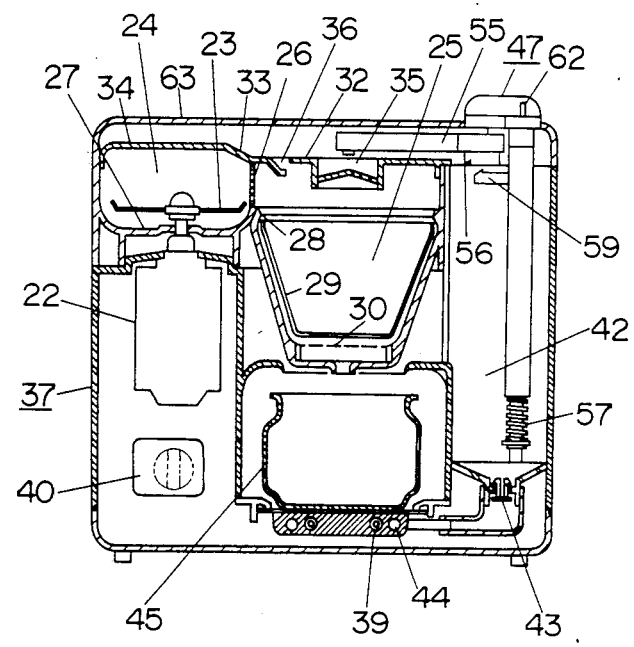
FIG. 3 is a vertical cross-sectional view of the coffee maker of FIG. 1.
Figure 4:
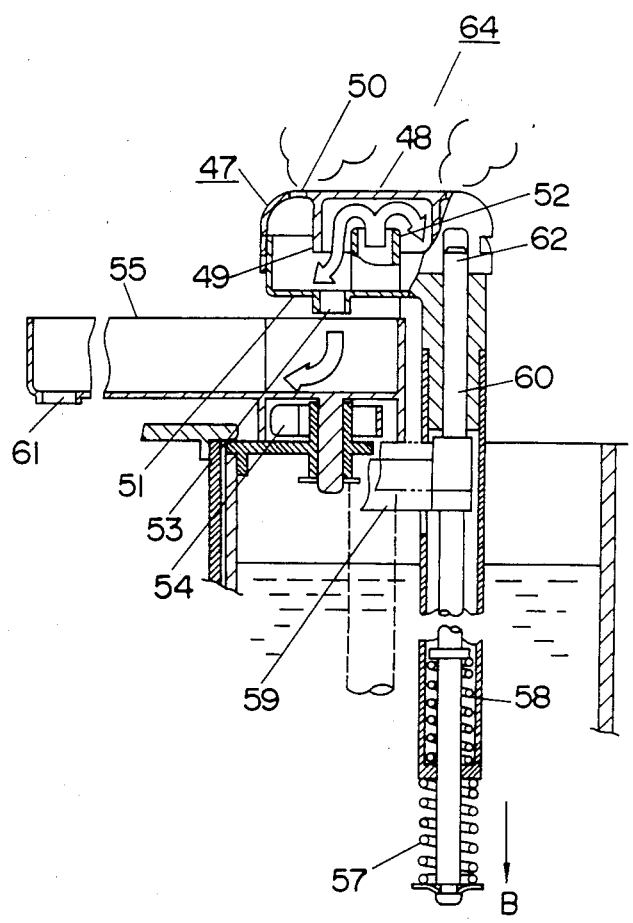
FIG. 4 is an enlarged cross-sectional view of an essential part of the coffe maker of FIG. 1.

An embodiment of the present invention will now be described with reference to the accompanying drawings. Referring first to FIGS. 1 to 4, reference numeral 1 denotes a grinding and filtering vessel which comprises a substantially cylindrical-shaped grinding compartment 24 having a cutter 23 rotated by a driving motor 22 and a filtering compartment 25 for accommodating coffee ground in this material grinding compartment 24 and for brewing that coffee. The material grinding compartment 24 and the filtering compartment 25 are integrally formed side by side, and communicate through a perforated portion 26 provided on a part of the peripheral wall of the material grinding compartment 24. The bottom 27 of the material grinding compartment 24 is formed in the form of a cone, and the perforated portion 26 is disposed in a manner such as to intersect a circle represented by the peripheral wall of the grinding compartment 24. Thus, at the time of grinding coffee beans, they are stirred to a suitable extent and uniformly ground, and after they have been ground to a size which permits the ground coffee to pass through the perforated portion 26, they pass into the filtering compartment 25. The filtering compartment 25 is provided with an annular rib 28 which has a substantially triangular-shaped cross-section and extends downwardly from the lower edge of the perforated portion 26. Accordingly, when a paper filter 29 is put in place, the ground and discharged coffee is kept from entering the gap between the filter 29 and the filtering compartment 25. A second filter 30 is provided at the bottom of the filtering compartment 25 so that any ground coffee which enters the gap between the filter 29 and the filtering compartment 25 is prevented from being mixed with the brewed coffee. A mesh type filter 31 which is made from a metal or synthetic resin may also be used in place of the paper filter 29.

Reference numeral 32 designates a lid for the grinding and filtering vessel 21. The lid 32 is provided with a dome-shaped protrusion 34 having a slanting surface 33, which protrusion is positioned above the filtering compartment 24. The lid 32 is also provided with a hot-water receiving portion 35 for sprinkling the hot water when it is supplied and a hole 36 through which steam is discharged, both being positioned above the filtering compartment 25. Reference numeral 37 indicates a coffee maker body which includes a left leg portion 38 accommodating a driving motor 22 and a time switch 40 for controlling the operating time of this driving motor 22 and turning on a heater 39 (to be described later) after the operation of the motor 22 has been completed, as well as a right leg portion 41 receiving a tank 42 for containing water. The tank 42 is connected through a check valve 43 provided at the bottom there of to a water pipe 44 which is provided integral with the heater 39. The coffee maker body 37 is provided at its central portion with a space for accommodating a decanter 45. An upper central portion which bridges the left and right leg portion 38, 41 has a slanted surface 46, so that the decanter 45 may be easily placed in position and removed. This slanted portion 46 also serves to prevent condensation of the steam generated from the coffee which has filtered into the decanter 45. The grinding and filtering vessel 21 in which the grinding compartment 24 and the filtering compartment 25 are formed integral with each other is detachably mounted on the coffee maker body 37.

Reference numeral 64 is a change-over device which includes a hot-water receiving chamber 47 and a hot-water guide 55, both being made of a heat-resistant synthetic resin. The hot-water receiving chamber 47 has a substantially cylindrical-shaped depending portion 49 provided below its upper surface 48 which is further provided with steam ejecting holes 50 in its outer periphery. At a bottom surface 51 of the hot-water receiving chamber 47 are provided a spout member 52 having its one end opened upward and the other end connected to the water pipe 44, as well as a hot-water discharge port 53, so that the discharged steam pressure may be reduced. The hot-water guide 55 is positioned below the hot-water discharge port 53, is pivotally mounted on the coffee maker body 37, and is resiliently urged toward the filtering compartment 25, i.e., in the direction shown by an arrow A, by means of a kick spring 54. The hot-water guide 55 serves to selectively introduce the hot water flowing from the hot-water discharge port 53 into either the tank 42 or the filtering compartment 25. The hot-water guide 55 is also provided with a notch 56.

A thermal responsive member 57 is disposed adjacent to the bottom of the tank 42, and is made of a shape memory alloy, such that it remains contracted by vitrue of the expansion pressure of a bias spring 58 when the temperature of the water in the tank 42 is low, and expands when the temperature of the water rises to that of the alloy memory, thereby lowering a rod 60 having a hook 59 in the direction shown by an arrow B. This shape memory alloy 57 is made of a Ni-Ti alloy which is highly resistant to corrosion and is harmless. The hook 59 on the rod 60 engages and latches the notch 56 of the hot-water guide 55 in a position where the open end 61 of the hot-water guide 55 faces the tank 42. The rod 60 has a protrusion 62 at its end, and the engagement of the hook 59 of the rod 60 with the notch 56 of the hot-water guide 55 can be optionally released by depressing this protrusion 62. Designated by reference numeral 63 is a cover for the coffee maker body 37, which cover serves to prevent dust from entering the body.

Operation of the coffee maker arranged in the manner described above will now be described. First, the cover 63 is removed. After the open end 61 of the hot-water guide 55 has been held on the side of the tank 42, the lid 32 for the grinding and filtering vessel 21 is taken off, a desired amount of coffee beans is charged in the filtering compartment 24, the filter 29 is placed in position in the filtering compartment 25 to extend over the side wall thereof, the tank 42 is supplied with a desired amount of water, and the lid 32 and the cover 63 are placed in position. Subsequently, the time switch 40 is set to a desired value. When the on-off switch is turned on, the driving motor 22 starts the operation of grinding the coffee beans. The ground coffee sequentially discharges into the filtering compartment 25 through the perforated portion 26. When such discharging is completed, the driving motor 22 stops, and the heater 39 is energized to heat the water in the water pipe 44 and allow it to boil locally. At that time, the water in the water pipe 44 is prevented from flowing back into the tank 42 by the check valve 43, but is forced into the hot-water receiving chamber 47 through the spout member 52 by pressure created by this boiling. The gushing pressure of this flow is lessened by the depending portion 49, and the flow is separated into steam and hot-water. The hot water then drips into the hot-water guide 55 through the hot-water discharge port 53 and returns to the tank 42, while the steam together with such undesirable ingredients as bleaching powder is discharged through the steam discharge ports 50. As a series of such operations is repeated, the temperature of the water in the tank 42 is gradually raised. The temperature of the hot water ejected from the spout member 52 ranges between 80 and 90° C. at the initial stage of the operation, and rises as the temperature of the water contained in the tank 42 is raised, and eventually reaches a boiling state of about 100° C. When the temperature of the water contained in the tank 42 reaches that of the memory of the shape memory alloy 57, this shape memory alloy 57 expands against the resilient force of the bias spring 58 to lower the rod 60. This causes the hook 59 on the rod 60 to move out of engagement with the notch 56 of the hot-water guide 55, thereby allowing the hot-water guide 55 to turn by the aid of the resilient force of the kick spring 54 to a position where the open end 61 of the hot-water guide 55 is positioned above the filtering compartment 25. The hot-water which has been heated up to 100° C. is thereby caused to drip over the ground coffee while being scattered by the hot-water receiving portion 35. At the initial stage of the operation when the hot water is being circulated between the tank 42 and the water pipe 44, the boiling which takes place in the water pipe 44 is intermittent, so that the water having a lower temperature gushes intermittently from the spout member 52. As the boiling becomes continuous, however, an extremely large amount of hot water having a temperature of 100° C. gushes continuously from the spout member 52. Thus this hot water of high temperature is continuously supplied to the filtering compartment 25.

Figure 5A:
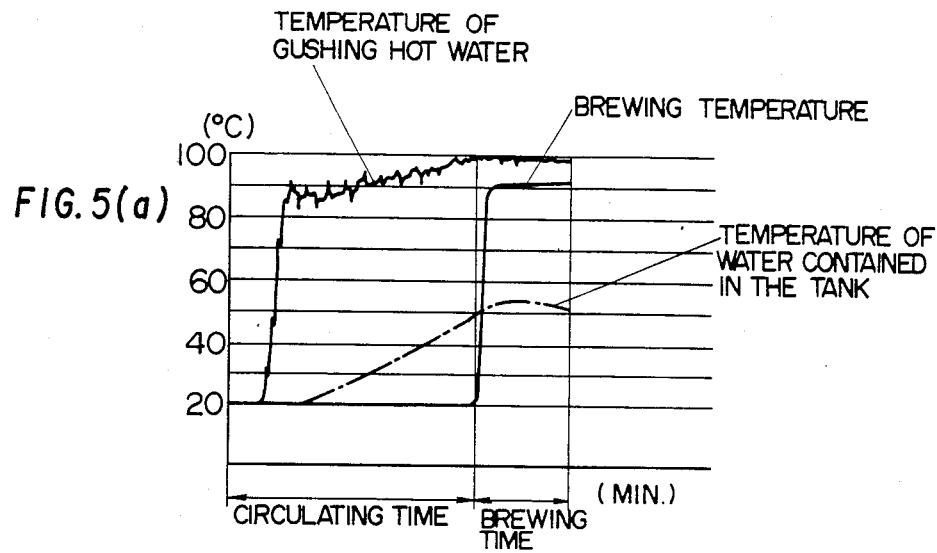
FIG. 5(a) shows the characteristic between the coffee brewing temperature and the brewing time in the coffee maker of FIG. 1 when water is being circulated.
Figure 5B:
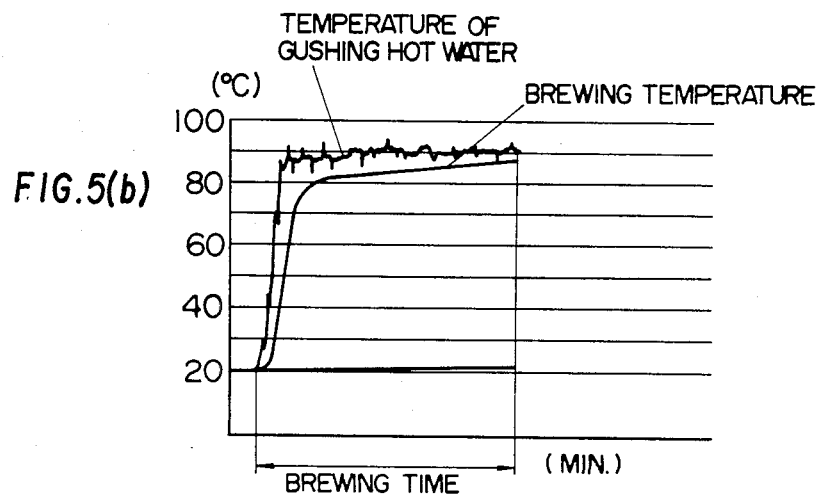
FIG. 5(b) shows the characteristic between the coffee brewing temperature and the brewing time when circulation is suspended.
Figure 8:
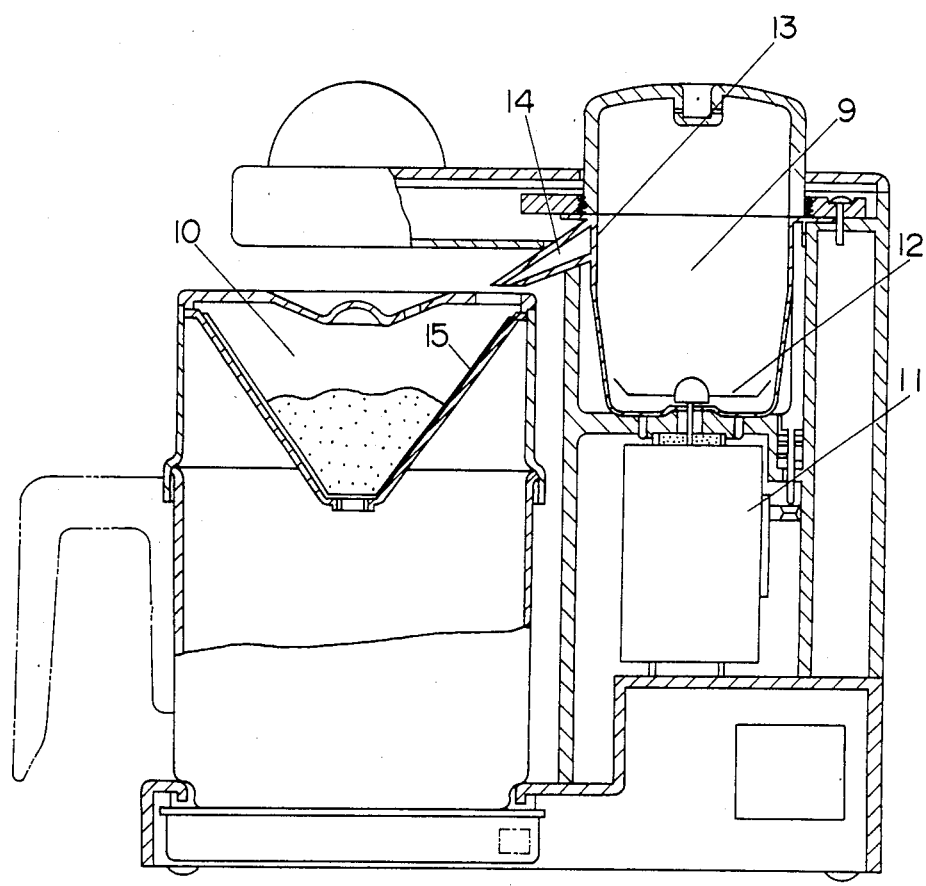
FIG. 8 is a side sectional view of a known fully-automatic electric coffee maker in which a coffee bean grinding compartment and a filtering compartment are provided side by side.

FIG. 5(a) shows changes with time in the temperatures of the hot water gushing from the spout member 52 in accordance with the operation described above, of the water in the tank 42 and of the brewing which takes place in the filtering compartment 25. FIG. 5(b) shows changes in the respective temperatures when coffee is brewed without circulation of hot water.

As shown in FIG. 5(a), when coffee is brewed after hot water has been circulated, it takes a longer time for the coffee to be brewed. On the other hand, when the coffee maker is turned on while the hook 59 of the rod 60 is disengaged from the notch 56 of the hot-water guide 55 by manually lowering the protrusion 62 of the rod 60 beforehand, it is possible to brew the coffee within the same period of time as is required for a conventional coffee maker.

INDUSTRIAL APPLICABILITY

As will be understood from the foregoing description of the embodiment, the electric coffee maker according to the present invention comprises a material grinding compartment having a cutter adapted to be drivingly rotated by a driving motor provided in a coffee maker body; a filtering compartment provided side by side with and communicated with said material grinding compartment; a tank for containing water; a heater section for heating water supplied from said tank; and a changeover means for performing a change-over action such that water having been heated by said heater section is circulated through said tank or supplied to said filtering compartment, said change-over means being constructed such that when the temperature of hot water contained in said tank reaches a boiling temperature owing to a circulating action in which water contained in said tank returns to said tank through said heater section and said change-over means from said tank, a thermal responsive member adapted to act in response to the temperature of hot water affords a change-over action between a position in which hot water circulates through said tank and a position in which hot water is supplied to said filtering compartment.

With this arrangement, when coffee beans are ground to a particle size which enables them to pass through the perforated portion provided in the portion of the grinding compartment, they are successively discharged into the filtering compartment through this perforated portion without being ground repeatedly before being discharged, and this makes the particle size of coffee uniform, and reduces an amount of fine powder.

When coffee is to be brewed, hot water of high temperature relieved of steam pressure is gently poured on the ground coffee without stirring it to adequately swell it, thus improving the filtering condition with the result that the brewing efficiency for soluble ingredients contained in the coffee can be increased. Furthermore, a desired amount of hot water can be continuously supplied within a short period of time, and an ideal brewing condition of coffee, that is, coffee of an appropriate particle size is obtained, and after the grinding operation hot-water which has been once boiled and relieved of undesirable ingredients such as bleaching powder is used to complete brewing coffee at the temperature of 92° to 96° C. within three or four minutes. Accordingly, the thus brewed coffee has a good aroma and a natural flavor of a high quality, which can not be obtained in prior electric coffee makers.

In the present invention, there is provided a time switch which after the lapse of a predetermined period of time causes electric energization to switch over to the heater section from the driving motor for driving the cutter, so that when a user sets only the time switch, the operation from grinding of coffee beans to brewing of the ground coffee can be automatically performed. In addition, the grinding compartment and the filtering compartment are formed integral with each other and are detachably mounted on the coffee maker body, so that handling and maintenance including clearance work are facilitated.

According to the present invention, the thermal responsive member is constructed to release locking of the hot-water guide and cause the same to switch over to the filtering compartment for supplying hot water. Thus the thermal responsive member is simple in construction, inexpensive and highly reliable in its performance. In addition, the thermal responsive member is formed of shape memory alloy which is anticorrosive and durable in performance. Furthermore, locking or latching of the hot water guide can be optionally released by manual operation, so that it is possible to shorten a period of time required for getting coffee ready.

What is claimed is:

1. An electric coffee maker comprising a material grinding compartment having a cutter adapted to be drivingly rotated by a driving motor provided in a coffee maker body; a filtering compartment provided side by side with and communicated with said material grinding compartment; a tank for containing water; a heater section for heating water supplied from said tank; and a change-over means for performing a change-over action such that water from said tank, having been heated by the heater section, is circulated back to said tank, through said change-over means or is supplied to said filtering compartment, said change-over means being constructed to chage over to supplying of hot water to said filtering compartment from circulation to said tank by means of a thermal responsive member which acts in response to a temperature of hot water when the hot water contained in said tank reaches a boiling temperature.

2. An electric coffee maker as set forth in claim 1 wherein said thermal responsive member is constituted by a shape memory alloy.

3. An electric coffee maker as set forth in claim 1 wherein said material grinding compartment and said filtering compartment communicates with each other through a perforated portion provided on a part of said material grinding compartment.

4. An electric coffee maker as set forth in claim 1 wherein electric energization of said driving motor and said heater section is controlled by a time switch means which causes electric energization to switch over to said heater section from said driving motor after the lapse of a predetermined period of time.

5. An electric coffee maker as set forth in claim 1 wherein said material grinding compartment and said filtering compartment are formed integral with each other and are detachably mounted on said coffee maker body.

6. An electric coffee maker as set forth in claim 1 wherein said change-over means comprises a hot water receiving chamber facing one end of a water pipe which has the other end communicated to the bottom of said tank through a check valve and having a steam discharge port and a hot water discharge port, and a hot water guide disposed below the hot water discharge port of said hot water receiving chamber and having an opened end which is movable between a position on the side of said tank and a position on the side of said filtering compartment.

7. An electric coffee maker as set forth in claim 6 wherein said hot water guide is moved by said thermal responsive member which acts in response to the temperature of hot water when the temperature of hot water contained in said tank reaches a boiling temperature.

8. An electric coffee maker as set forth in claim 6 wherein said hot water guide can be optionally moved by manual operation.

* * * * *